United States Patent [19]

Cygnarowicz et al.

[11] Patent Number: 5,000,924
[45] Date of Patent: Mar. 19, 1991

[54] AUTOACCELERATION CONTROL FOR EXOTHERMIC REACTORS

[75] Inventors: Robert M. Cygnarowicz, Rochester, N.Y.; Joseph G. Patella, Mentor, Ohio

[73] Assignee: Elsagainternational B.V., Amsterdam, Netherlands

[21] Appl. No.: 304,885

[22] Filed: Jan. 31, 1989

Related U.S. Application Data

[63] Continuation of Ser. No. 57,591, Jun. 1, 1987, abandoned.

[51] Int. Cl.$^5$ ............................................. G05B 13/00
[52] U.S. Cl. ........................................ 422/109; 165/39; 196/132; 208/159; 208/DIG. 1; 422/62
[58] Field of Search .................. 422/109, 62; 165/39; 196/132; 208/159, DIG. 1

[56] References Cited

U.S. PATENT DOCUMENTS

| | | | |
|---|---|---|---|
| 1,951,725 | 3/1934 | Christ | 196/53 |
| 3,402,121 | 9/1968 | Hallman | 208/59 |
| 3,481,860 | 12/1969 | Borst | 208/111 |
| 3,656,911 | 4/1972 | Hobbs . | |
| 3,718,577 | 2/1979 | Nai et al. | 208/108 |
| 3,733,476 | 5/1973 | Hopkins et al. | 235/151.12 |
| 3,781,533 | 12/1973 | Barnstone et al. | 235/150.1 |
| 3,972,804 | 8/1976 | McLaughlin et al. | 208/108 |
| 3,974,064 | 8/1976 | Bajek et al. | 208/134 |
| 3,974,065 | 8/1976 | Powell et al. | 208/213 |
| 3,981,793 | 9/1976 | Christie et al. | 208/108 |
| 4,132,529 | 1/1979 | Schwimmer . | |
| 4,132,530 | 1/1979 | Schwimmer . | |
| 4,187,542 | 2/1980 | Ball et al. | 422/109 X |
| 4,236,219 | 11/1980 | Killebrew, Jr. et al. | 422/109 X |
| 4,249,908 | 2/1981 | Funk | 422/62 X |
| 4,400,784 | 8/1983 | Funk et al. | 422/110 X |
| 4,477,413 | 10/1984 | Carson | 422/62 |
| 4,491,924 | 1/1985 | Agarwal | 364/500 |
| 4,551,238 | 11/1985 | Marks | 208/340 |
| 4,617,110 | 10/1986 | Hinajos et al. | 208/211 |
| 4,681,674 | 7/1987 | Graven et al. | 208/59 |
| 4,818,372 | 4/1989 | Mauleon et al. | 208/113 |

Primary Examiner—Robert J. Warden
Assistant Examiner—Jill Johnston
Attorney, Agent, or Firm—Vytas R. Matas; Robert J. Edwards; Daniel S. Kalka

[57] ABSTRACT

An autoacceleration control for a catalytic hydrocracker wherein, by means of a model of the reactor, there is generated a signel predicting the reaction temperature and means under the control of the signal adjusting the rate of application of a corrective agent to thereby inhibit auto acceleration of the hydrocracker.

8 Claims, 3 Drawing Sheets

REACTOR FLOWSHEET

FIG. 1A
CONTINUOUS STIRRED TANK REACTOR MODEL

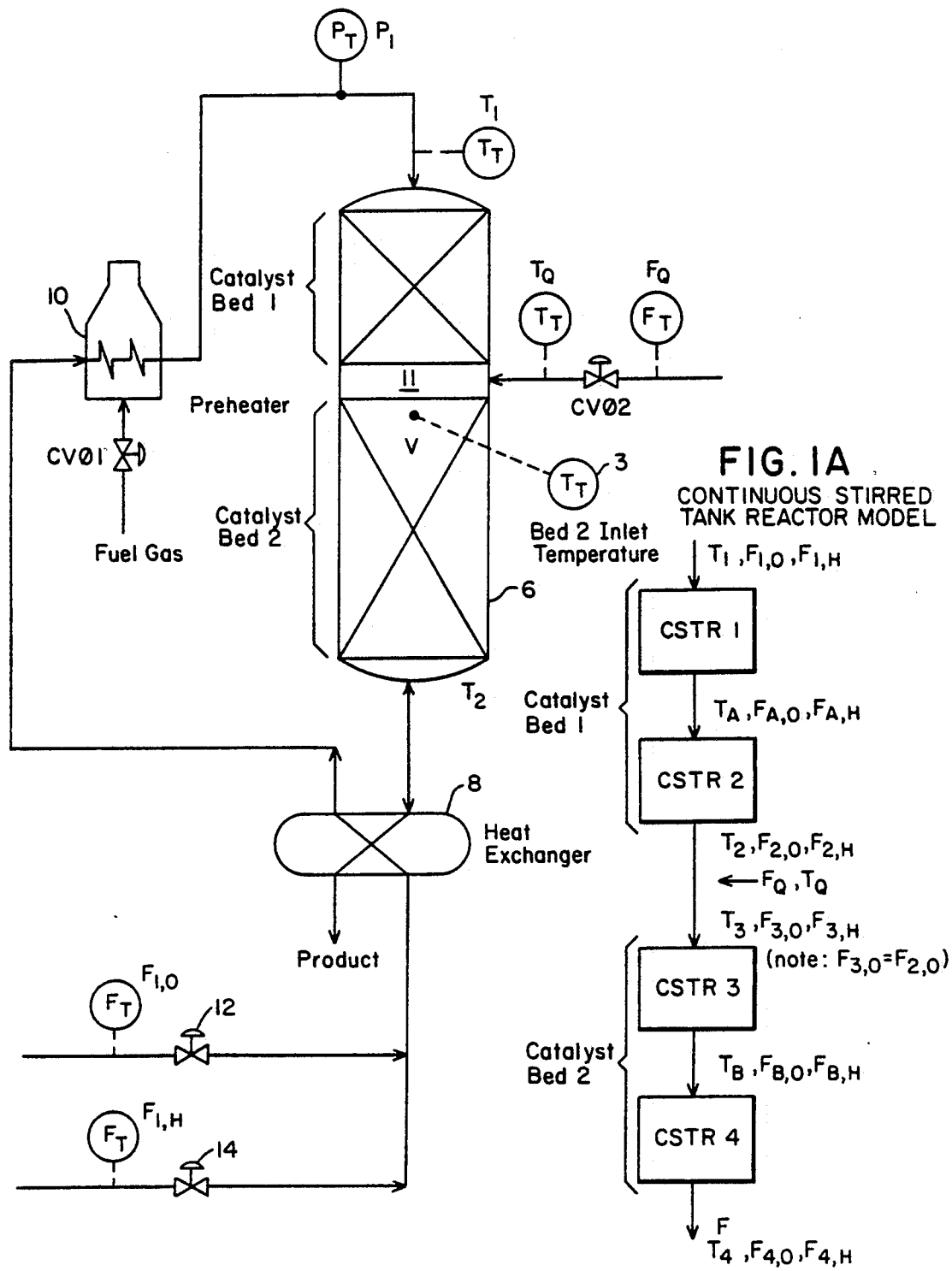

AUTOACCELERATION CONTROL FOR EXOTHERMIC REACTORS

This is a continuation of application Ser. No. 07/057,591 filed 6/1/87, now abandoned.

FIELD OF THE INVENTION

This invention relates to autoacceleration control for exothermic reactors and more particularly the autoacceleration control for catalytic hydrocrackers wherein heavy hydrocarbon fractions are converted to lighter, more valuable components. While the cracking is endothermic, the hydrogenation is exothermic and the process is overall exothermic. Since reaction rate increases exponentially with temperature, the process has the potential to autoaccelerate or run away with deleterious effects. It is therefore of extreme importance that exothermic reactors be provided with control means inhibiting the chain reaction from producing excessive reaction rates and temperatures.

DESCRIPTION OF THE PRIOR ART

At this time, reactor cooling is based directly on current process data. The deficiency in this approach is that the potential for autoacceleration is detected when reactor temperatures are already at high values. The later that autoacceleration is detected the higher is the likelihood of an actual runaway because: 1. the time available for operator action is reduced and/or, 2. the rate of increase in reaction rate is higher.

SUMMARY OF THE INVENTION

An objective of this invention is to generate, by means of a mathematical model of an exothermic process a control signal for adjusting the rate of application of a corrective agent to inhibit the exothermic process from producing excessive reactor temperatures. This and other objectives of this invention will be apparent as the description proceeds in connection with the drawings, in which:

BRIEF DESCRIPTION OF THE DRAWINGS

FIG. 1 is a schematic view of a typical catalytic hydrocracker process.

FIG. 1A shows the model for a hydrocracker having CSTR's (Continuous Stirred Tank Reactors) in series.

DETAILED DESCRIPTION

Figure 2A:
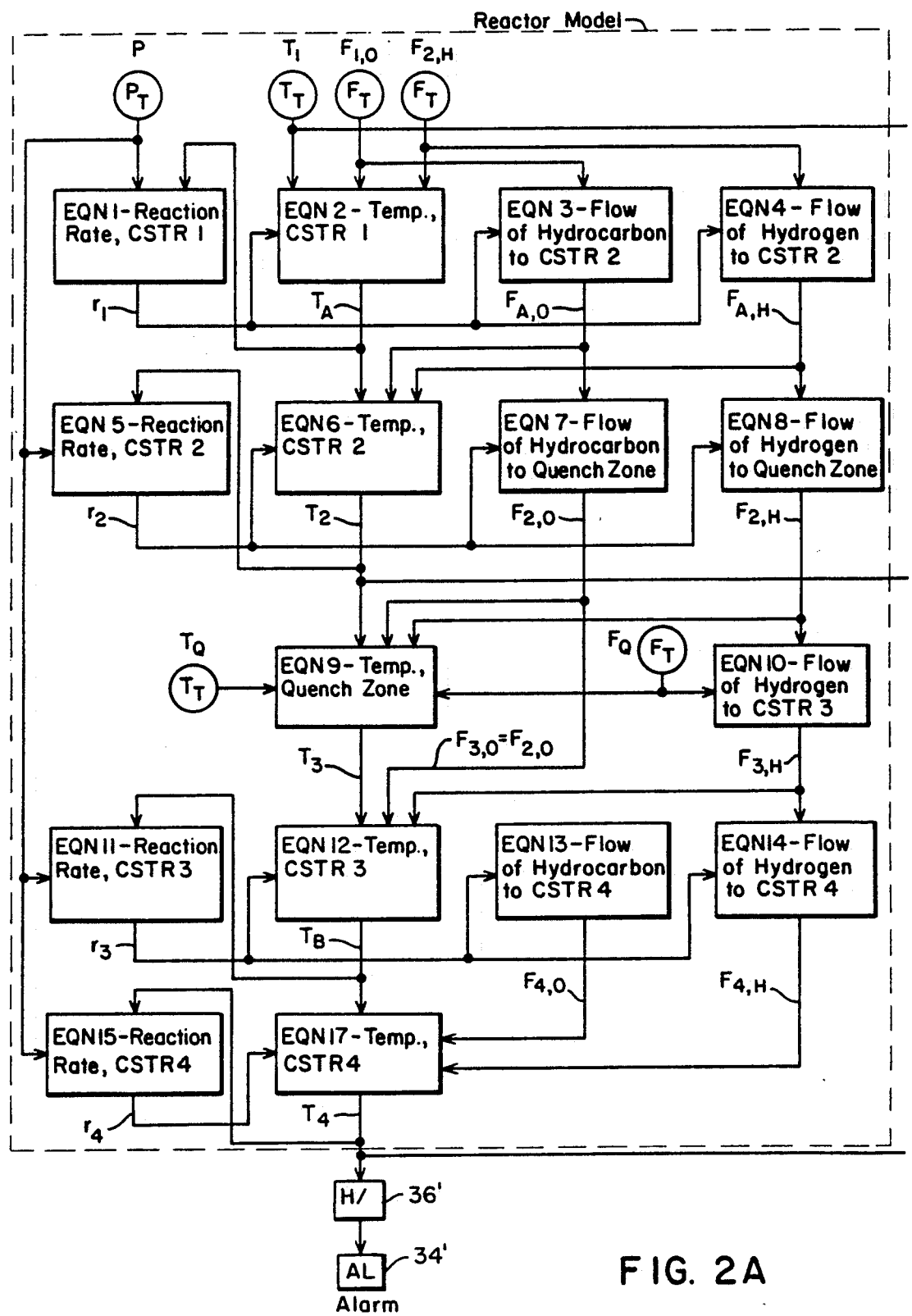
FIG. 2 is a control diagram of the reactor model for generating control signals and illustrating a typical application of such signals in the control of a hydrocracker.

There is shown in FIG. 1 a typical catalytic hydrocracker process. A mixture of hydrocarbons F1,O and hydrogen F1,H form the feedstock, which after passing through a heat exchanger 8 and preheater 10, the rate of flow of fuel gas thereto being adjustable by means of a control valve CV01, discharges into a hydrocracker 6. Disposed within the hydrocracker 6 as shown in FIG. 1A are a plurality of continuous stirred tank reactors (CSTR's) in series, identified in FIG. 1A as CSTR1, CSTR2, CSTR3 and CSTR4 for converting the heavy hydrocarbon fractions in the feedstock to lighter more valuable components. The effluent leaving the hydrocracker 6, after passing through the heat exchanger 8 is discharged through a conduit 14 for further processing. Between CSTR2 and CSTR3 there is introduced into a so-called quench zone 11, a coolant, such as hydrogen; the rate of flow of which is adjusted by a control valve CV02.

In under ordinary conditions the rate of flow of fuel gas to the preheater 10 is controlled by means of valve CV01 to maintain a predetermined temperature of the feedstock discharged into the hydrocracker 6. This invention comprehends, however, upon a predicted temperature in CSTR2 approaching a predetermined critical value to reduce the rate of fuel flow. Thus control of the rate of flow of fuel gas to the preheater 10 is one form of a corrective agent which can be employed to inhibit autoacceleration of the hydrocracker. Similarly, under ordinary conditions, the rate of flow of coolant to the quench zone 11 is controlled by means of valve CV02 to maintain a predetermined temperature of the throughput at the inlet to CSTR3. This invention further comprehends upon a predicted temperature in CSTR4 approaching a predetermined critical value to increase the flow of coolant. Thus control of the rate of coolant flow into the quench zone 11 is another form of a corrective agent which can be employed to inhibit autoacceleration of the hydrocracker.

Referring now to FIG. 1A each catalyst bed is modeled as two continuous CSTR's in series. Heat balance incorporating reaction kinetics are made over each CSTR to calculate their respective temperatures. The temperature of the second CSTR for each bed model is the calculated bed outlet temperature.

The equations for the model in FIG. 1A are presented below. Equation (1) estimates the reaction rate (moles of hydrogen consumed) in CSTR 1 with an Arhenius expression. The reaction rate is a function of hydrogen partial pressure, but knowledge of reactor vapor composition is not usually available. Therefore, total pressure is used which has the same net effect.

$$r_1 = \frac{ahk_1 Pm_1 \mathrm{EXP}(-E_a/RT_A)}{N_1} \quad (1)$$

where
$r_1$ = reaction rate, CSTR1
$a$ = catalyst activity
$h$ = feed reactivity
$k_1$ = reaction rate constant, bed 1
$P$ = reactor pressure
$m_1$ = mass fraction of catalyst in bed 1
$N_1$ = number of CSTR's modeling bed 1
$E_a$ = activation energy
$R$ = gas constant
$T_A$ = temperature of CSTR1

The temperature of CSTR1, $T_A$, is calculated in Equation (2). Therefore, the value of $T_A$ used in Equation (1) will be the last calculated value for $T_A$. For the first iteration (i.e. model initialization) $T_A$ is set equal to the reactor inlet temperature, $T_1$. Equation (1) contains two "tunable" parameters, catalyst activity and feed reactivity. Catalyst activity is a function of the amount of oil processed. Feed reactivity is a function of feedstock composition and the degree of feed hydrotreating. Equation (2) incorporates the result of Equation (1) in a heat balance around CSTR1 to calculate the temperature of CSTR1.

$$T_A = T_1 + f_1 r_1 Hrxn/(F_{1,O}C_o + F_{1,H}C_H) \quad (2)$$

where
$T_A$ = temperature of CSTR1
$T_I$ = reactor inlet temperature
$f_1$ = fraction of reaction heat as sensible heat
Hrxn = heat of reaction
$F_{1,O}$ = hydrocarbon feed flow
$C_o$ = hydrocarbon heat capacity
$F_{1,H}$ = reactor inlet hydrogen flow
$C_H$ = hydrogen heat capacity As the hydrocracking reaction proceeds, the hydrocarbon volumetric flow increases and hydrogen is consumed. Equations (3) and (4) calculate the new flows entering CSTR2 based on these volume changes.

$$F_{A,O} = F_{1,O} + C' * r_1 \quad (3)$$

$$F_{A,H} = F_{1,H} - C'' * r_1 \quad (4)$$

where
$F_{A,O}$ = hydrocarbon flow to CSTR2
$C'$ = hydrocarbon volume change with reaction
$F_{A,H}$ = hydrogen flow to CSTR2
$C''$ = hydrogen volume change with reaction.

Based on the temperature calculation in Equation (2) and the flow calculations in Equations (3) and (4), a reaction rate and temperature for CSTR2 are estimated in Equations (5) and (6), respectively.

$$r_2 = \frac{ahk_1 Pm_1 \text{EXP}(-E_a/RT_2)}{N_1} \quad (5)$$

$$T_2 = T_A + f_1 r_2 Hrxn/(F_{A,O}C_o + F_{A,H}C_H) \quad (6)$$

where
$r_2$ = reaction rate, CSTR2
$T_2$ = temperature of CSTR2, or predicted bed 1 outlet temperature As with CSTR1, the CSTR2 reaction rate calculation uses the value of $T_2$ from the last Equation (6) computation. The result of Equation (5) is then used in Equation (6) to update $T_2$. The value of $T_2$ used in the initial calculation of $r_2$ is the first calculation result for $T_A$, the temperature of CSTR1.

The volume changes in the hydrocarbon and hydrogen flows due to cracking and hydrogenation in CSTR2 are considered in Equations (7) and (8), respectively.

$$F_{2,O} = F_{A,O} + C' * r_2 \quad (7)$$

$$F_{2,H} = F_{A,H} - C'' * r_2 \quad (8)$$

where
$F_{2,O}$ = hydrocarbon flow to quench zone
$F_{2,H}$ = hydrogen flow to quench zone (from bed 1)

The calculations presented in Equations (1) and (6) are repeated for the second bed once the inlet flows and temperature to CSTR3 are determined. This is accomplished by mass and energy balances around the quench zone. The results of these balances are given in Equations (9), (10), and (11).

$$T_3 = \frac{F_{2,O}C_oT_2 + C_H(F_{2,H}T_2 + F_QT_Q) + f_2F_QH_V}{(F_{2,O}C_o + F_{2,H}C_H + F_QC_H)} \quad (9)$$

where
$T_3$ = quench zone temperature
$T_Q$ = temperature of hydrogen quench
$f_2$ = volume of hydrocarbon vapors condensing per volume of quench
$F_Q$ = flow of hydrogen quench
$H_V$ = hydrocarbon heat of condensation A heat generation term, $f_2 F_Q H_V$, is included in Equation (9) for the heat released from condensing hydrocarbon vapors. The model assumes that condensation is in proportion to the quench flow. The quench zone mass balances show that $$F_{3,O} = F_{2,O} \quad (10)$$

$$F_{3,H} = F_{2,H} + F_Q \quad (11)$$

where
$F_{3,O}$ = hydrogen flow to CSTR3
$F_{3,O}$ = hydrogen flow to CSTR3

The volumetric hydrocarbon flow to CSTR3 is equal to the hydrocarbon flow to the quench zone, $F_{2,H}$. Equation (10) is included for notational consistency. Equations (12) through (17) below calculate the reactor outlet temperature in the same manner as the bed 1 outlet temperature was determined.

$$r_3 = \frac{ahk_2 Pm_2 \text{EXP}(-E_a/RT_B)}{N_2} \quad (12)$$

where
$r_3$ = reaction rate, CSTR3
$T_B$ = temperature of CSTR3
$m_2$ = mass fraction of catalyst in bed 2
$N_2$ = number of CSTR's modeling bed 2
$k_2$ = reaction rate constant, bed 2

$$T_B = T_3 + f_1 r_3 Hrxn/(F_{3,O}C_o + F_{3,H}C_H) \quad (13)$$

The volumetric flow to CSTR4 is calculated in Equations (14) and (15).

$$F_{4,O} = F_{3,O} + C' * r_3 \quad (14)$$

$$F_{4,H} = F_{3,H} - C'' * r_3 \quad (15)$$

where
$F_{4,O}$ = hydrocarbon flow to CSTR4
$F_{4,H}$ = hydrogen flow to CSTR4

Finally, the reaction rate and temperature of CSTR4 are obtained from Equations (16) and (17), respectively.

$$r_4 = \frac{ahk_2 Pm_2 \text{EXP}(-E_A/RT_4)}{N_2} \quad (16)$$

$$T_4 = T_B + f_1 r_4 Hrxn/(F_{4,O}C_o + F_{4,H}C_H) \quad (17)$$

Figure 2B:
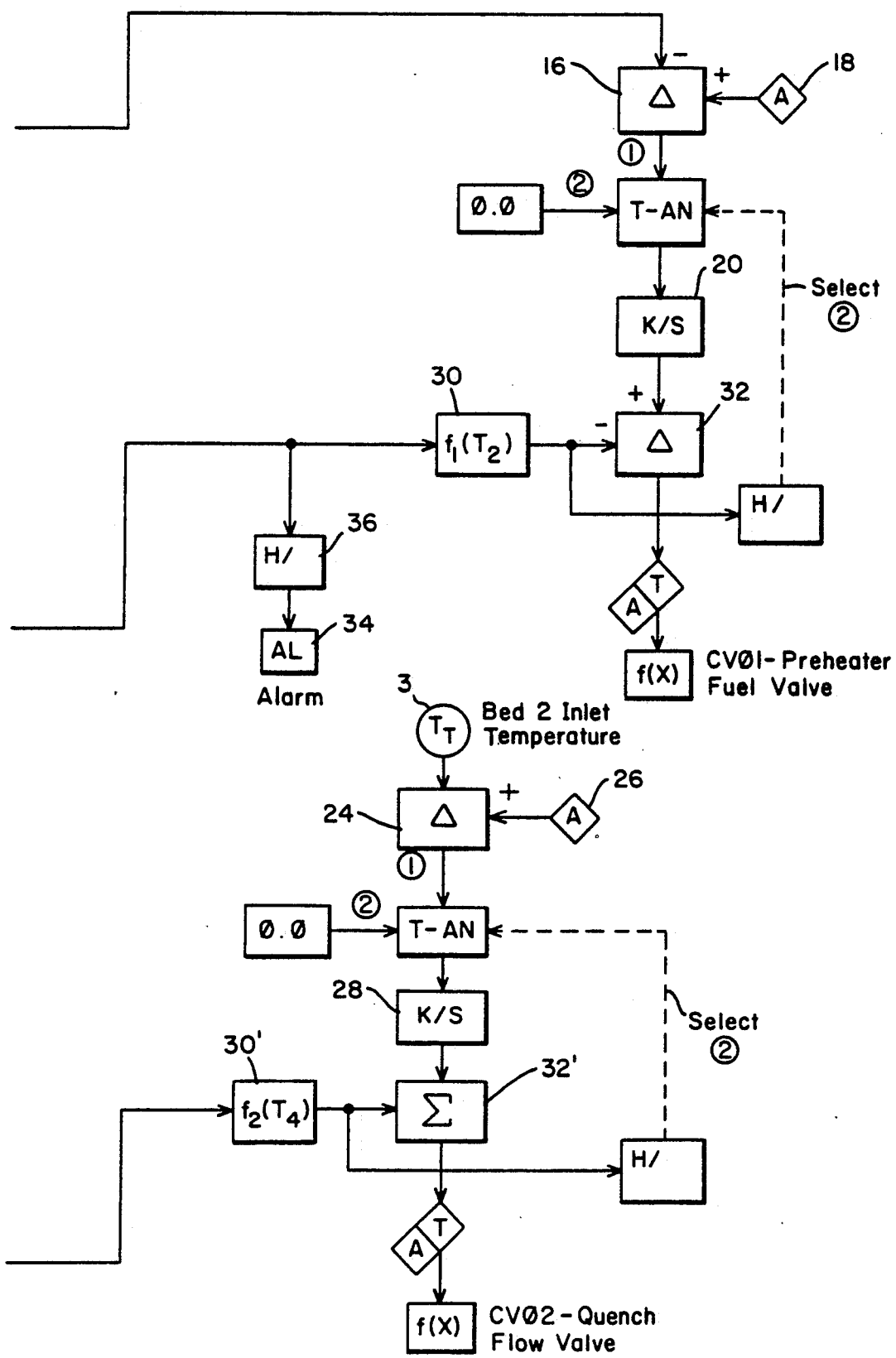

The control schematic for the invention is presented in FIG. 2. The logical operations for implementing the reactor model, Equations (1) through (17), are simple additions, subtractions, multiplications, divisions, and exponentials. Therefore, the equations are presentated as black boxes with only the inputs and outputs identified.

Hydrocracker control systems presently in use are of the one element type wherein the rate of flow of fuel gas to a preheater which is adjusted as required to maintain the feed stock temperature at the entrance to the hydrocracker at a predetermined set point value and wherein the rate of flow of hydrogen quench is adjusted as required to maintain the temperature of the throughput following the quench zone at set point value. Thus as shown in FIG. 2, a signal proportional to feed stock temperature, generated in transmitter $T_1$ is transmitted to a difference unit 16 where it is compared to a set point signal generated in manually adjustable unit 18, the output difference signal, by means of a proportional plus integral unit 20, adjusts the valve CV1 as required to maintain the temperature $T_1$ at set point value. In a similar control a signal proportional to the thorughput temperature at the inlet to CSTR3, generated in a transmitter 3 is transmitted to a difference unit 24 where it is compared to a set point signal generated in manually adjustable unit 26, the output difference signal, by means of a proportional plus integral unit 28 adjusts quench flow valve CV2 as required to maintain the throughput temperature at the inlet to CSTR3 at set point value.

Such controls cannot react with sufficient speed to maintain set point values under upset reactor conditions. Even under normal conditions, because of thermal lag, transportation lag and the like such controls easily become unstable causing cycling reactor temperatures of ever increasing amplitude eventually resulting in an auto acceleration condition.

As shown in FIG. 2, a signal proportional to $T_2$, predicted bed 1 outlet temperature, inputs to function generator 30, the output signal from which inputs to a difference unit 32. So long as the signal proportional to $T_1$ remains below a predetermined critical value function generator 30 may be adjusted to null the output signal therefrom, when the signal proportional to $T_2$ is above the critical value the function generator is adjusted to generate an output signal varying in desired linear or non-linear relationship to the input signal and hence effecting a decrease in fuel flow to the preheater 10. The signal proportional to $T_2$ is also arranged to activate an alarm 34 at a predetermined value established by a manually adjustable signal generator 36.

A similar control, responsive to a signal proportional to $T_4$, predicted bed 2 temperature, operates to adjust valve CV02 to increase the flow of hydrogen to the quench zone 11 as required to inhibit auto acceleration of bed 2. Assuming unit 32' replaces difference unit 32 in the control system.

The temperature controllers are prevented from moving in the incorrect direction when there associated function generator outputs are non-zero. This is accomplished by setting the controller error signals to zero upon a non-zero contribution from the function generators. The switch is carried out by an analog transfer function, denoted T-AN in FIG. 2.

We claim:

1. An apparatus for autoacceleration control for an exothermic reactor, comprising:
   means for sensing feed stock temperature entering the exothermic reactor and establishing a signal indicative thereof;
   means for comparing said feed stock temperature signal with a predetermined temperature signal, said comparing means being in communication with said feed stock temperature sensing means;
   means for generating a signal predicting a first catalyst bed outlet temperature;
   means for receiving said first catalyst bed outlet temperature signal and establishing an output signal representative of a difference of the feed stock temperature and the first catalyst bed outlet temperature; and
   means for controlling rate of fuel flow to a preheater responsive to changes in said output signal for inhibiting the exothermic process from producing excessive reaction rates with an increase in temperature.

2. An apparatus for autoacceleration control, as defined in claim 1, further comprising:
   means for sensing a second catalyst bed inlet temperature and establishing a signal indicative thereof;
   means for comparing said second catalyst bed inlet temperature signal with a predetermined second catalyst bed inlet temperature signal, said comparing means being in communication with said second catayst bed sensing means;
   means for generating a signal predicting a second catalyst bed outlet temperature;
   means for receiving said second catalyst bed outlet temperature signal and establishing a second output signal representative of a difference of the second catalyst bed inlet and outlet temperatures; and
   means for controlling rate of coolant flow to a quench zone responsive to changes in said second output signal.

3. An apparatus for autoacceleration control, as defined in claim 2, wherein said means for controlling rate of fuel flow adjusts the temperature of the feed stock discharged into the reactor.

4. An apparatus for autoacceleration control, as defined in claim 1, wherein said signal generating means provides a reaction rate for a second continuous stirred tank reactor as determined by the equation:

$$r_2 = \frac{ahk_1 Pm_1 \text{EXP}(-E_a/RT_2)}{N_1}$$

where
   $r_2$ = reaction rate
   $a$ = catalyst activity
   $h$ = feed reactivity
   $k_1$ = reaction rate constant, bed
   $P$ = reactor pressure
   $m_1$ = mass fraction of catalyst in bed
   $N_1$ = number of continuous stirred tank reactors in bed
   $E_a$ = activation energy
   $R$ = gas constant
   $T_2$ = temperature of second continuous stirred tank reactor 5. An apparatus for autoacceleration control, as defined in claim 4, wherein said signal generating means further provides an updated temperature of the second continuous stirred tank reaction as determined by equation:

$$T_2 = T_A + f_1 r_2 H_{rxn}/(F_{A,O} C_O + F_{A,H} C_H)$$

where
   $T_A$ = temperature of the first continuous stirred tank reactor
   $f_1$ = fraction of reaction heat as sensible heat
   $H_{rxn}$ = heat of reaction
   $F_{A,O}$ = hydrocarbon flow to second continuous stirred tank reactor
   $C_O$ = hydrocarbon heat capacity $F_{A,H}$ = hydrogen flow to second continuous stirred tank reactor $C_H$ = hydrogen heat capacity 6. An apparatus for autoacceleration control, as defined in claim 5, wherein the calculated reaction rate is used to update the temperature of the second continuous stirred tank reactor.

7. A method for autoacceleration control for an exothermic reactor, comprising the steps of:

sensing feed stock temperature and establishing a signal indicative thereof;

comparing the feed stock temperature signal with a predetermined temperature signal;

calculating a predicted first catalyst bed outlet temperature and establishing a signal indicative thereof;

transmitting the first catalyst bed outlet temperature signal to a function generator for establishing an output signal representative of a difference of the feed stock temperature and the first catalyst bed outlet temperature; and controlling rate of fuel flow to a preheater in accordance with changes in the output signal for inhibiting the exothermic process from producing excessive reaction rates with an increase in temperature.

8. A method for autoacceleration control, as defined in claim 7, further comprising the steps of:

sensing a second catalyst bed inlet temperature and establishing a signal indicative thereof;

comparing the second catalyst bed inlet temperature signal with a predetermined second catalyst bed inlet temperature signal;

calculating a predicted second catalyst bed outlet temperature and establishing a signal indicative thereof;

transmitting the second catalyst bed outlet temperature signal to a function generator for establishing a second output signal representative of a difference of the second catalyst bed inlet and outlet temperatures; and controlling the rate of coolant flow to a quench zone in accordance with changes in the second output signal for inhibiting the exothermic process from producing excessive reaction rates with an increase in temperature.

* * * * *